US009809062B2

(12) United States Patent
Kiwaki (10) Patent No.: US 9,809,062 B2
(45) Date of Patent: Nov. 7, 2017

(54) TIRE

(71) Applicant: BRIDGESTONE CORPORATION, Tokyo (JP)

(72) Inventor: Yukihiro Kiwaki, Higashimurayama (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 330 days.

(21) Appl. No.: 14/406,680

(22) PCT Filed: Jun. 17, 2013

(86) PCT No.: PCT/JP2013/066548
§ 371 (c)(1),
(2) Date: Dec. 9, 2014

(87) PCT Pub. No.: WO2013/191119
PCT Pub. Date: Dec. 27, 2013

(65) Prior Publication Data
US 2015/0151587 A1 Jun. 4, 2015

(30) Foreign Application Priority Data

Jun. 19, 2012 (JP) .................................. 2012-137853
Jun. 19, 2012 (JP) .................................. 2012-137857

(51) Int. Cl.
*B60C 11/04* (2006.01)
*B60C 11/12* (2006.01)
(Continued)

(52) U.S. Cl.
CPC ...... *B60C 11/1259* (2013.01); *B60C 11/0304* (2013.01); *B60C 11/0306* (2013.01);
(Continued)

(58) Field of Classification Search
CPC ............ B60C 11/0304; B60C 11/1236; B60C 11/1353; B60C 2011/0355; B60C 11/125; B60C 2011/0344
See application file for complete search history.

(56) References Cited

U.S. PATENT DOCUMENTS 4,456,046 A * 6/1984 Miller ................ B60C 11/0302
152/209.18
D547,259 S * 7/2007 Fontaine ..................... D12/555
(Continued)

FOREIGN PATENT DOCUMENTS

GB 1549347 A * 8/1979
JP 62-103206 A * 5/1987
(Continued)

OTHER PUBLICATIONS

Machine translation for Japan 10-029412 (no date).*
(Continued)

*Primary Examiner* — Steven D Maki
(74) *Attorney, Agent, or Firm* — Sughrue Mion, PLLC (57) ABSTRACT

A tire includes a circumferential direction main groove on a tread surface, first and second circumferential supplemental grooves located on both sides of the circumferential direction main groove, and first and second central land portions formed between the circumferential direction main groove and the first and second circumferential direction supplemental grooves. The first and second central land portions have plural width direction sipes, respectively, and each of the width direction sipes extends to the circumferential main groove, the circumferential main groove has shallow grooved portions and deep grooved portions. The deep grooved portions are deeper than the shallow grooved portions, and the shallow grooved portions are shallower than the circumferential supplemental grooves.

7 Claims, 4 Drawing Sheets

(51) Int. Cl.
*B60C 11/13* (2006.01)
*B60C 11/03* (2006.01)

(52) U.S. Cl.
CPC ........ *B60C 11/0309* (2013.01); *B60C 11/125* (2013.01); *B60C 11/1236* (2013.01); *B60C 11/1353* (2013.01); *B60C 2011/036* (2013.01); *B60C 2011/0344* (2013.01); *B60C 2011/0355* (2013.01); *B60C 2011/0365* (2013.01); *B60C 2011/0369* (2013.01); *B60C 2011/0388* (2013.01)

(56) References Cited

U.S. PATENT DOCUMENTS

| | | | |
|---|---|---|---|
| 2006/0090828 A1* | 5/2006 | Yamane | B60C 11/0309 152/209.18 |
| 2007/0017618 A1* | 1/2007 | Miyasaka | B60C 11/0302 152/209.18 |
| 2011/0041973 A1 | 2/2011 | Numata | |
| 2011/0146863 A1 | 6/2011 | Ochi | |
| 2012/0273106 A1* | 11/2012 | Kiwaki | B60C 11/0302 152/209.18 |
| 2013/0000804 A1* | 1/2013 | Kiwaki | B60C 11/0309 152/209.1 |
| 2013/0098520 A1 | 4/2013 | Kato | |

FOREIGN PATENT DOCUMENTS

| | | | |
|---|---|---|---|
| JP | 2-13804 U | | 1/1990 |
| JP | 06-080002 A | * | 3/1994 |
| JP | 10-029412 A | * | 2/1998 |
| JP | 2001-206020 A | | 7/2001 |
| JP | 2010-12931 A | | 1/2010 |
| JP | 2011-42282 A | | 3/2011 |
| JP | 2011/235701 A | | 11/2011 |
| JP | 2012-46004 A | | 3/2012 |
| JP | 2012-86599 A | | 5/2012 |
| WO | 2010/001785 A1 | | 1/2010 |
| WO | WO-2011/062026 A1 | * | 5/2011 |
| WO | WO-2011/102457 A1 | * | 8/2011 |
| WO | 2011/138939 A1 | | 11/2011 |
| WO | 2012/026545 A1 | | 3/2012 |

OTHER PUBLICATIONS

Machine translation for Japan 06-080002 (no date).*
Machine translation for Japan 62-103206 (no date).*
JPO Office Action for Application No. 2012-137853 dated Oct. 22, 2013.
International Search Report for PCT/JP2013/066548 dated Aug. 27, 2013 [PCT/ISA/210].
Written Opinion for PCT/JP2013/066548 dated Aug. 27, 2013 [PCT/ISA/237].

* cited by examiner

| | EMBODIMENT 1 | EMBODIMENT 2 | COMPARATIVE EXAMPLE 1 | COMPARATIVE EXAMPLE 2 |
|---|---|---|---|---|
| CONFIGURATION OF CIRCUMFERENTIAL DIRECTION MAIN GROOVE (UNIT: mm) | 6.5 / 6.0 | 6.5 / 6.0 | 6.0 | 6.5 |
| SHORT SIPE | — | PRESENT | — | — |
| DRAINAGE PERFORMANCE (INDEX NUMBER) | 102 | 102 | 100 | 102 |
| HANDLING-AND-STABILITY (INDEX NUMBER) | 102 | 101 | 100 | 97 |
| RIDE COMFORT (INDEX NUMBER) | 100 | 102 | 100 | 100 |

TIRE

CROSS REFERENCE TO RELATED APPLICATIONS

This application is a National Stage of International Application No. PCT/JP2013/066548, filed on Jun. 17, 2013, which claims priority from Japanese Patent Application Nos. 2012-137853, and 2012-137857, filed on Jun. 19, 2012, the contents of all of which are incorporated herein by reference in their entirety.

TECHNICAL FIELD

The present invention relates to a tire, particularly, to a tire that satisfies both of a drainage performance and handling-and-stability on a wet road surface.

BACKGROUND ART

Conventionally, in a pneumatic tire installed to a passenger car and so on (hereinafter, a tire), a method in which plural circumferential direction grooves are formed on a tread surface is widely used in order to secure a drainage performance on a wet road surface.

For example, a tire disclosed in a Patent Literature 1 secures a drainage performance by including, on a tread surface, plural circumferential direction grooves, plural inclined grooves each inclined to a circumferential direction and extending from a tire equator toward tread edges, and plural sipes each extending with being inclined to the circumferential direction in an opposite direction to the inclined grooves and intersecting with the plural inclined grooves.

PRIOR ART DOCUMENT

Patent Documents

Patent Literature 1: Japanese Patent application Laid-Open No. 2001-206020

SUMMARY OF INVENTION

However, if a groove negative rate (an area ratio of grooves on a tread surface) is increased in order to secure a drainage performance on a wet road surface, an effective ground contact area of the tread surface is decreased and thereby handling-and-stability degrades. In the tire disclosed in the Patent Literature 1, almost parallelogram-shaped blocks formed by the circumferential direction grooves and the inclined grooves are further divided into plural small pieces by the sipes extending with being inclined in the opposite direction to the inclined grooves, so that a block rigidity degrades. As a result, handling-and stability cannot be secured sufficiently.

Therefore, an object of the present invention is to provide a tire that satisfies both of a drainage performance on and handling-and-stability on a wet road surface.

In order to solve the above-mentioned problem, the present invention has following aspects. First, a first aspect of the present invention is a tire (a tire 1) comprising: a circumferential direction main groove (a circumferential direction main groove 100) extending in a circumferential direction on a tread surface; a pair of circumferential direction supplemental grooves (a first circumferential direction supplemental groove 210, a second circumferential direction supplemental groove 220) extending in the circumferential direction, and located on both sides of the circumferential direction main groove in a tread width direction; and a pair of central land portions (a central land portion 310, a second central land portion 320) having a rib shape, and formed between the circumferential direction main groove and the pair of circumferential direction supplemental grooves, wherein each of the central land portions has a plurality of sipes (width direction sipes 311, 321), and each of the sipes extends to the circumferential direction main groove to form an opened portion (an opened portion 312, 322), the circumferential direction main groove has shallow grooved portions (shallow grooved portions 110) and deep grooved portions (deep grooved portions 120) a depth (a depth D2) of which from the tread surface is larger than a depth (a depth D1) of the shallow grooved portions from the tread surface, and the depth of the shallow grooved portions from the tread surface is smaller than a depth (a depth D3) of the circumferential direction supplemental grooves from the tread surface.

According to the aspect, each of the central land portions has the plurality of sipes, so that a drainage performance can be secured.

In addition, the circumferential direction main groove has the shallow grooved portions and the deep grooved portions that are deeper than the shallow grooved portions. Namely, since the circumferential direction main groove can increase its cross-sectional area by having a so-called "groove in groove", a drainage performance can be secured while restricting increase of a groove negative rate.

In addition, the depth of the shallow grooved portions is formed smaller than the depth of the circumferential direction supplemental grooves. Namely, the pair of central land portions formed between the pair of circumferential direction supplemental grooves is apparently divided by the circumferential direction main groove, but is made contiguous via the sallow grooved portions shallower than the circumferential direction supplemental grooves. As a result, movements of the central land portions during rotations of the tire can be restricted, and thereby handling-and-stability can be secured.

A second aspect of the present invention has a feature that, according to the first aspect of the present invention, each of the deep grooved portions has a circumferential direction deep groove (a circumferential direction deep groove 121) extending in the circumferential direction, and inclined deep grooves (inclined deep grooves 122A, 122B) inclined to the circumferential direction, and the inclined deep grooves extend from circumferential-direction ends of the circumferential direction deep groove to the opened portions of the sipes of the central land portions.

A third aspect of the present invention has a feature that, according to the second aspect of the present invention, in the deep grooved portions, the inclined deep groove extending from one of the circumferential-direction ends of the circumferential direction deep groove toward the opened portion of the sipe of one of the central land portions and the inclined deep groove extending from another of the circumferential-direction ends of the circumferential direction deep groove toward the opened portion of the sipe of another of the central land portions are aligned alternately in the circumferential direction.

A fourth aspect of the present invention has a feature that, according to the first aspect of the present invention, a plurality of short sipes (short sipes 140) that are opened to the circumferential direction main groove are formed on the central land portion (the first central land portion 310)

located on an inner side when the tire is installed on a vehicle, and a length (a length ls) of the short sipes is smaller than a length (a length Ls) of the sipes, and a width (a width ws) of the short sipes is larger than a width (a width Ws) of the sipes.

A fifth aspect of the present invention has a feature that, according to the fourth aspect of the present invention, an inclined angle, to a tread width direction, of the sipes of the central land portion located on the inner side when the tire is installed on the vehicle is larger than an inclined angle, to the tread width direction, of the sipes of the central land portion located on an outer side when the tire is installed on the vehicle.

A sixth aspect of the present invention has a feature that, according to the first aspect of the present invention, a pair of shoulder land portions (a first shoulder land portion 410, a second shoulder land portion 420) on outer sides of the circumferential direction supplemental grooves in the tread width direction, and each of the shoulder land portions having a plurality of lug grooves (first lug grooves 411, second lug grooves 421) that communicates with the circumferential direction supplemental groove, wherein the sipes of the central land portions communicate with the circumferential direction supplemental grooves on extended lines extending from the lug grooves toward the circumferential direction supplemental grooves, and cutout portions (cutout portions 313, 323) are formed at positions where the sipes of the central land portions communicate with the circumferential direction supplemental grooves.

A seventh aspect of the present invention has a feature that, according to the first aspect of the present invention, chamfer portions are formed at lease along a circumferential-direction edge of the central land portion adjacent to the circumferential direction main groove.

A eighth aspect of the present invention has a feature that, according to the first aspect of the present invention, a depth (a depth D3) of the circumferential direction supplemental grooves from the tread surface is smaller than a depth (a depth D2) of the deep grooved portions from the tread surface.

According to the present invention, it is possible to provide a tire that satisfies both of a drainage performance and a handling-and-stability on a wet road surface.

DESCRIPTION OF EMBODIMENTS

Next, an embodiment of a tire according to the present invention will be explained with reference to the drawings. Specifically, (1) Overall Configurations, (2) Configurations of Circumferential Direction Main Groove, (3) Configurations of Sipes, (4) Configurations of Central Land Portions, (5) Configurations of Shoulder Land Portions, (6) Comparative Estimation, (7) Behaviors and Advantages, and (8) Other Embodiments will be explained.

Note that, in following descriptions about the drawings, identical or equivalent portions are labelled with identical or equivalent reference numbers. However, the drawings are schematic, and it should be kept in mind that ratios of dimensions and so on may be different from their actual ones. Therefore, specific dimensions and so on should be understood in consideration of following explanations, and it may be probable that they include portions that are different among the drawings in their mutual relations of dimensions and their mutual ratio.

(1) Overall Configurations

Figure 1:
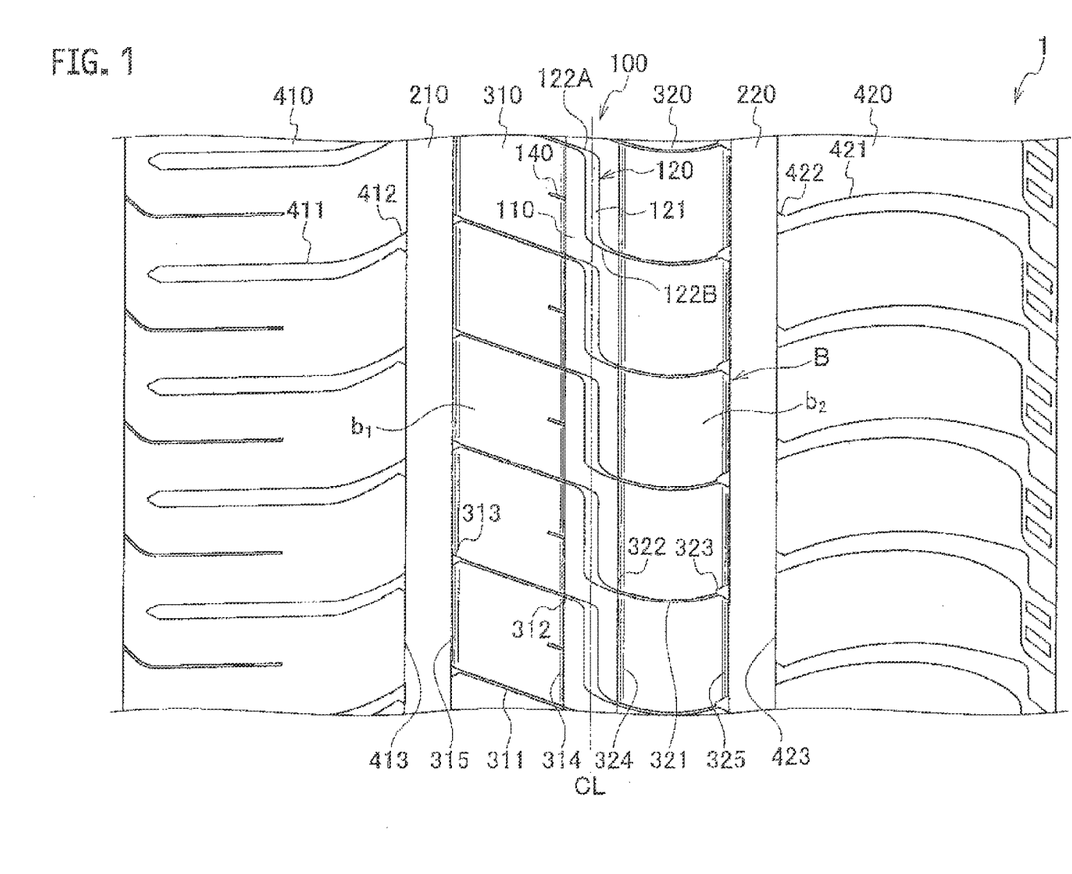
FIG. 1 is a front view of a tread surface of a tire 1 according to an embodiment of the present invention.
Figure 2:
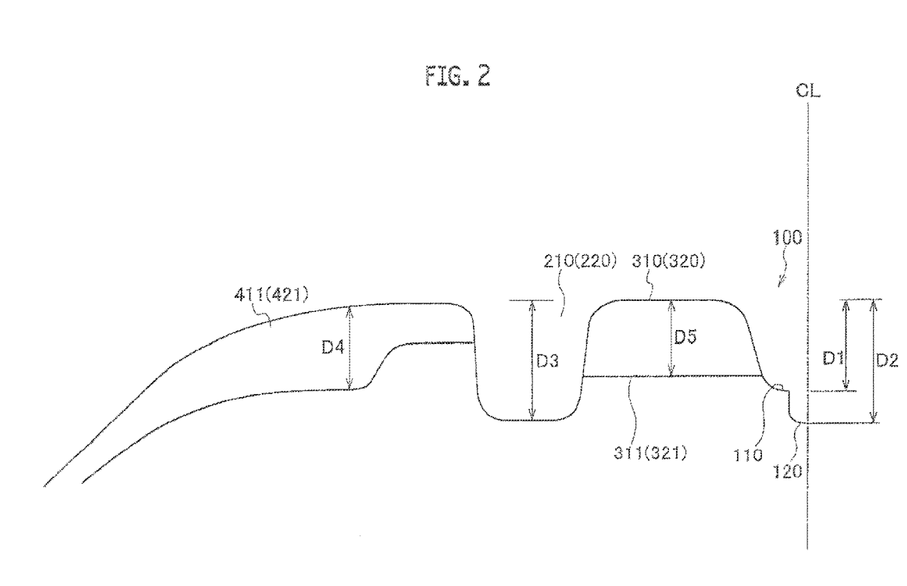
FIG. 2 is a cross-sectional view of the tread surface of the tire 1 according to the embodiment of the present invention.

FIG. 1 is a front view of a tread surface of a tire 1 according to an embodiment of the present invention. FIG. 2 is a cross-sectional view of the tread surface of the tire 1 according to the embodiment of the present invention. The tire 1 is a pneumatic tire filled with air, but it can be filled with inert gas such as nitrogen gas instead of air.

As shown in FIG. 1, the tread surface of the tire 1 includes a circumferential direction main groove 100 extending in a circumferential direction, and a first circumferential direction supplemental groove 210 and a second circumferential direction supplemental groove 220 that extend in the circumferential direction and that are located on both sides of the circumferential direction main groove 100 in a tread width direction, respectively. In FIG. 1, the circumferential direction main groove 100 is formed so as to extend linearly on a tire equator CL.

A first central land portion 310 having a rib shape is formed between the circumferential direction main groove 100 and the first circumferential direction supplemental groove 210, and a second central land portion 320 having a rib shape is formed between the circumferential direction main groove 100 and the second circumferential direction supplemental groove 220. A first shoulder land portion 410 is formed on an outer side of the first circumferential direction supplemental groove 210 in the tread width direction, and a second shoulder land portion 420 is formed on an outer side of the second circumferential direction supplemental groove 220 in the tread width direction.

Plural width direction sipes 311 are formed on the first central land portion 310, and plural width direction sipes 321 are formed on the second central land portion 320. Each of the width direction sipes 311 and 321 is opened to the circumferential direction main groove 100 to form an opened portion 312, 322. In addition, plural short sipes 140 are formed on the first central land portion 310. Detailed configurations of these sipes will be explained later.

Plural first lug grooves 411 are formed on the first shoulder land portion 410. The first fug groove(s) 411 has an opened portion 412 opened to the first circumferential direction supplemental groove 210, and extends from an outer edge of the first shoulder land portion 410 on a side of the first circumferential direction supplemental groove 210 toward an outer side in the tread width direction. Plural second lug grooves 421 are formed on the second shoulder land portion 420. The second fug groove(s) 421 has an opened portion 422 opened to the second circumferential direction supplemental groove 220, and extends from an outer edge of the second shoulder land portion 420 on a side of the second circumferential direction supplemental groove 220 toward an outer side in the tread width direction.

When installing the tire 1 on a vehicle, it is preferable that it is installed so that the first central land portion 310, the first circumferential direction supplemental groove 210 and the first shoulder land portion 410 are located on an inner side of the vehicle, and the second central land portion 320, the second circumferential direction supplemental groove 220 and the second shoulder land portion 420 are located on an outer side of the vehicle. Hereinafter, explanations will be made on the premise that portions to which an ordinal number "first" is added are located on the inner side of the vehicle and portions to which an ordinal number "second" is added are located on the outer side of the vehicle.

(2) Configurations of Circumferential Direction Main Groove 100

As shown in FIG. 1, the circumferential direction main groove 100 has shallow grooved portions 110, and deep grooved portions 120 that has a deeper depth from the tread surface than the shallow grooved portions 110. The deep grooved portion(s) 120 has a circumferential direction deep groove 121 extending in the circumferential direction, and inclined deep grooves 122A and 122B extending obliquely to the circumferential direction. In FIG. 1, the deep grooved portions 120 are formed so as to extend linearly on the tire equator CL.

In FIG. 1, the inclined deep groove(s) 122A extends from one end of the circumferential direction deep groove 121 in the circumferential direction to a side wall of the circumferential direction main groove 100 on the first central land portion 310 so as to form an angle α1 to the tread width direction. Conversely, the inclined deep groove(s) 122B extends from another end of the circumferential direction deep groove 121 in the circumferential direction to a side wall of the circumferential direction main groove 100 on the second central land portion 320 so as to form an angle α2 to the tread width direction. Note that the angle α1 is an angle between a central line of the inclined deep groove 122A in its width direction and the tread width direction at the side wall of the circumferential direction main groove 100 on the side of the first central land portion 310, and the angle α2 is an angle between a central line of the inclined deep groove 122B in its width direction and the tread width direction at the side wall of the circumferential direction main groove 100 on the side of the second central land portion 320. The angle α1, α2 is 0° to 20°, and, preferably α1≥α2.

Since the circumferential direction main groove 100 has the above-explained configurations, each of the deep grooved portions 120 forms an S-shaped or reversed S-shaped depressed portion to the shallow grooved portion 110, as shown in FIG. 1. In addition, the shallow grooved portion(s) 110 forms an S-shaped or reversed S-shaped protruded portion from the deep grooved portion 120. Namely, the shallow grooved portions 110 and the deep grooved portions 120 are arranged so as to be aligned alternately along the circumferential direction.

In addition, the inclined deep groove(s) 122A is terminated at a position identical to a position of the opened portion 312 of the width direction sipe 311 in the circumferential direction. Namely, when the tread surface is viewed from front, each of the inclined deep grooves 122A is contiguous to the width direction sipe 311, and each of the inclined deep grooves 122B is contiguous to the width direction sipe 321, as shown in FIG. 1.

As shown in FIG. 2, a depth D1 of the shallow grooved portions 110 is smaller (shallower) than a depth D3 of the first and second circumferential direction supplemental grooves 210, 220 from the tread surface. It is preferable that the depth D1 of the shallow grooved portions 110 from the tread surface is larger (deeper) than a depth D5 of the width direction sipes 311, 321. It is preferable that a depth D2 of the deep grooved portions 120 from the tread surface is larger (deeper) than the depth D3 of the first and second circumferential direction supplemental grooves 210, 220 from the tread surface. Note that a "depth" of each groove is a distance from the tread surface to a bottom of each groove.

(3) Configurations of Sipes

Figure 3:
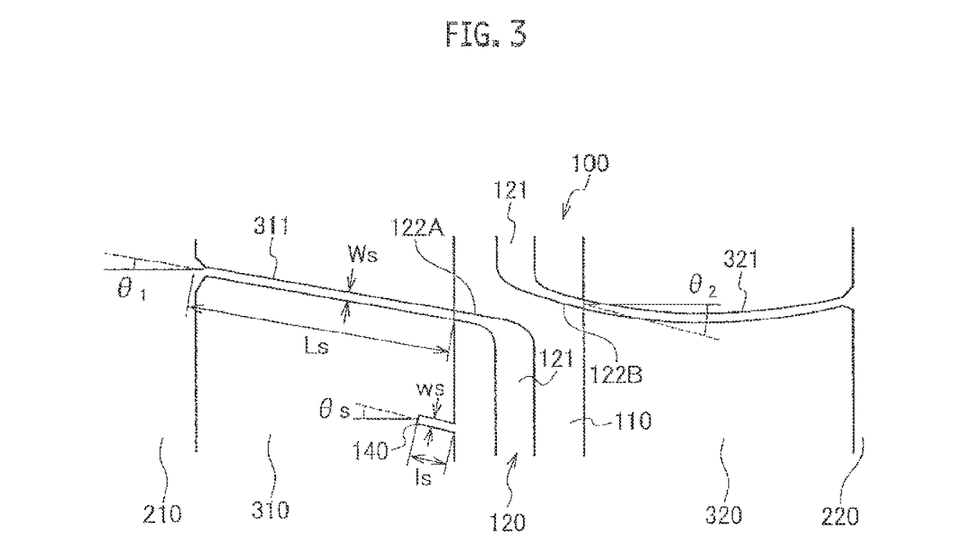
FIG. 3 is a detail view of width direction sipes 311 and 321, and a short sipe 140.

FIG. 3 is a detail view of the width direction sipes 311 and 321, and the short sipe 140. It is preferable that the width direction sipe 311 is formed as a so-called open-type sipe extending from an outer edge of the first central land portion 310 on a side of the circumferential direction main groove 100 to another outer edge thereof on a side of the first circumferential direction supplemental groove 210. It is preferable that the width direction sipe 321 is formed as a so-called open-type sipe extending from an outer edge of the second central land portion 320 on a side of the circumferential direction main groove 100 to another outer edge thereof on a side of the second circumferential direction supplemental groove 220.

It is preferable that the width direction sipe(s) 311 is formed linearly so as to be inclined with an angle $\theta_1$ (in FIG. 3, $\theta_1$=α1) to the tread width direction and the width direction sipe(s) 321 is formed curvedly so as to be inclined with an angle $\theta_2$ (in FIG. 3, $\theta_2$=α2) to the tread width direction. Note that the angle $\theta_1$ is an angle between a central line of the width direction sipe(s) 311 in its width direction and the tread width direction, and the angle $\theta_2$ is an angle between a tangential line of the curvature of width direction sipe(s) 321 and the tread width direction. The angle $\theta_1$, $\theta_2$ is 0° to 20°, and, preferably $\theta_1 > \theta_2$.

A cutout portion 323 is formed at a position where the width direction sipe(s) 321 is opened to the second circumferential direction supplemental groove 220. In addition, a cutout portion 313 can be also formed at a position where the width direction sipe(s) 311 is opened to the first circumferential direction supplemental groove 210.

Each of the short sipes 140 is formed as a so-called closed-type sipe extending from an outer edge of the first central land portion 310 on a side of the circumferential direction main groove 100 and terminated in the first central land portion 310. A length is of the short sipe(s) 140 is smaller (shorter) than a length Ls of the width direction sipe 311, and a width ws of the short sipe(s) 140 is larger (wider) than a width Ws of the width direction sipe 311. Note that a "width" of each sipe is a length in a direction perpendicular to a direction along which each sipe extends, and a "length" thereof is an extended length of the center line in its width direction of each sipe.

The short sipe(s) 140 is formed linearly so as to be inclined with an angle θs to the tread width direction. Note that the angle θs is an angle between the center line of the short sipe(s) 140 in its width direction and the tread width direction. The θs is 0° to 20°, and, preferably θs=$\theta_1$.

(4) Configurations of Central Land Portions

As shown in FIG. 1, the first and second central land portion(s) 310, 320 has a configuration in which plural small blocks b1 and b2 formed by the circumferential direction main groove 100, the circumferential direction supplemental grooves 210 and 220, and the sipes 311 and the 321 are made contiguous in the circumferential direction, respectively. In addition, one small block b1 of the first central land portion 310 and one small block b2 of the second central land portion 320 are connected with each other via the s-shaped or reversed S-shaped shallow grooved portion 110 to form a large block B. Therefore, the first and second central land portion(s) 310, 320 has a configuration in which the large blocks B are made contiguous in the circumferential direction with the deep grooved portions 120 interposed therebetween. In a case where the angles $\theta_1$, $\theta_2$ between the width direction sipes 311, 321 and the tread width direction satisfy $\theta_1 > \theta_2$, the large block(s) B becomes a block having a shape extending long in the circumferential direction.

In the first central land portion 310, chamfer portions 314 are formed along its outer edge on a side of the circumferential direction main groove 100, and chamfer portions 315 are formed along its outer edge on a side of the first circumferential direction supplemental groove 210. In the second central land portion 320, chamfer portions 324 are formed along its outer edge on a side of the circumferential direction main groove 100, and chamfer portions 325 are formed along its outer edge on a side of the second circumferential direction supplemental groove 220. The cutout portion(s) 313, 323 is formed in a range of the chamfer portion(s) 315, 325.

(5) Configurations of Shoulder Land Portions

It is preferable that, in the first shoulder land portion 410, chamfer portions 413 are formed along its outer edge on a side of the first circumferential direction supplemental groove 210, and, in the second shoulder land portion 420, chamfer portions 423 are formed along its outer edge on a side the second circumferential direction supplemental groove 220. It is preferable that cutout portion(s) is formed at the opened portion(s) 412, 422 in a range of the chamfer portion(s) 413, 423.

It is preferable that a depth D4 of the first and second lug grooves 411, 421 on an outer side in the tread width direction is larger (deeper) than the depth D5 of the width direction sipes 311, 321. It is preferable that a level of a bottom surface of the first lug grooves 411 is raised near the opened portion 412 and a depth of the raised portion is smaller than the depth D4, and a bottom surface of the second lug grooves 421 is raised its level near the opened portion 422 and a depth of the raised portion is smaller than the depth D4.

(6) Comparative Estimation

Figure 4:
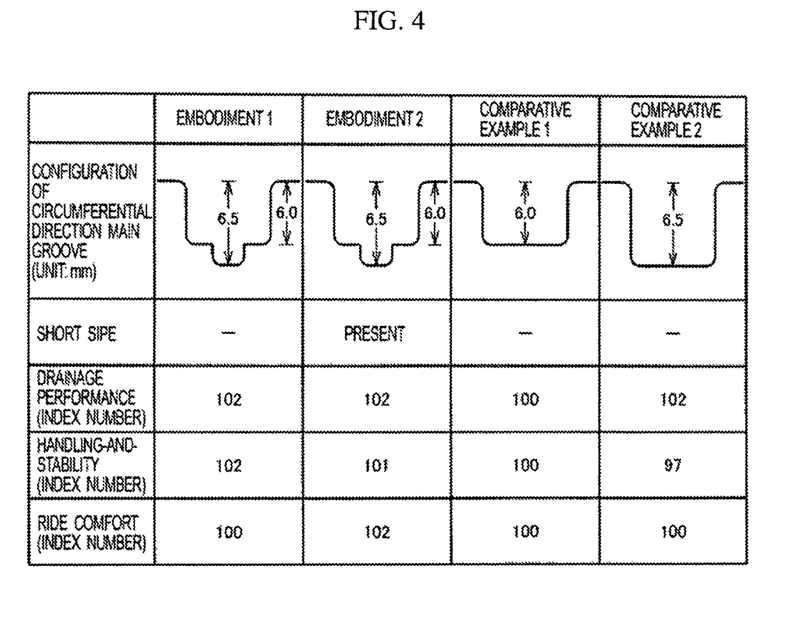
FIG. 4 is a table showing a comparative estimation using tires according to embodiments and comparative examples.

Next, comparative estimation by using tires according to embodiments and comparative examples will be explained with reference to a FIG. 4 in order to clarify advantages according to the present invention further. In the tires according to the embodiments and the comparative examples, configuration of only the circumferential direction main groove or the presence or absence of the short sipes is differentiated as shown in the FIG. 4, but other configurations are made identical.

With respect to the drainage performance, running test are done at a test course with 2 mm of water depth by using vehicles to which the tires according to the embodiments and the comparative examples are installed so as to accelerate its speed from low speed to high speed in incremental steps, and speeds at which hydroplaning phenomenon occurs are compared. In the FIG. 4, the speed at which hydroplaning phenomenon occurs with a vehicle to which the tires according to the first comparative example 1 is installed is denoted as "100", and then the speeds at which hydroplaning phenomenon occurs with vehicles to which the tires according to the embodiments 1 and 2 and the comparative example 2 are installed are indicated with index numbers. The larger the index number is, the higher the drainage performance is.

With respect to the handling-and-stability, running test are done at a test course with 2 mm of water depth by using vehicles to which the tires according to the embodiments and the comparative examples are installed, and sensory estimations by a professional driver with respect to grip feeling and steering responsibility are compared. In the FIG. 4, the estimation for a vehicle to which the tires according to the first comparative example 1 is installed is denoted as "100", and then the estimations for vehicles to which the tires according to the embodiments 1 and 2 and the comparative example 2 are installed are indicated with index numbers. The larger the index number is, the better the handling-and-stability is.

With respect to the ride comfort, running test are done at a test course with 2 mm of water depth by using vehicles to which the tires according to the embodiments and the comparative examples are installed, and sensory estimations by a professional driver with respect to ride comfort are compared. In the FIG. 4, the estimation for a vehicle to which the tires according to the first comparative example 1 is installed is denoted as "100", and then the estimations for vehicles to which the tires according to the embodiments 1 and 2 and the comparative example 2 are installed are indicated with index numbers. The larger the index number is, the better the ride comfort is.

As a result, the tires according to the embodiments 1 and 2 record better results than those by the comparative examples 1 and 2. The comparative example 2 with a larger-depth circumferential direction main groove is superior to the embodiments 1 and 2 with respect to the drainage performance, but the estimation for the comparative example 2 is the lowest with respect to the handling-and-stability. According to the sensory estimations by the professional driver, the embodiments 1 and 2 brings better grip feelings than the comparative examples 1 and 2, and their responsibilities when steering a steering wheel are also better. In addition, the tires according to the embodiment 2 get the best estimation with respect to the ride comfort.

Namely, the tires according to the embodiments 1 and 2 bring better handling-and-stability, and is not inferior to others with respect to the drainage performance. Therefore, it is confirmed that the tires according to the embodiments can satisfy both of the drainage performance and the handling-and-stability on a wet road surface.

(7) Behaviors and Advantages

In the above-explained embodiment, each of the first and second central land portions 310, 320 can secure a drainage performance by having the plural width direction sipes 311, 321. In addition, by the width direction sipes 311, 321, movements of the first and second central land portions 310, 320 during rotations of tires can be restricted, and thereby degradation of rolling resistance can be restricted.

In addition, since the circumferential direction main groove 100 can increase its cross-sectional area by having a so-called "groove in groove", a drainage performance can be secured while restricting increase of a groove negative rate.

In addition, the first and second central land portions 310, 320 are apparently divided by the circumferential direction main groove 100, but are made contiguous via the sallow grooved portion(s) 110 shallower than the first and second circumferential direction supplemental grooves 210, 220. As a result, movements of the first and second central land portions 310, 320 during rotations of tires can be restricted, and thereby handling-and-stability can be secured.

In addition, when the tread surface is viewed from front, each of the inclined deep grooves 122A is contiguous to the width direction sipe 311. Namely, the large block(s) B is formed by making the small block(s) b1 of the first central land portion 310 and the small block(s) b2 of the second central land portion(s) 320 contiguous to each other via the S-shaped or reversed S-shaped sallow grooved portion(s) 110, and the large blocks B are made contiguous in the circumferential direction with the deep grooved portion 120 interposed therebetween. As a result, the movements of the first and second central land portions 310, 320 during rotations of tires can be further restricted, and thereby handling-and-stability can be secured.

In addition, the inclined deep groove(s) 122A extending from one end of the circumferential direction deep groove(s) 121 in the circumferential direction toward the opened portion(s) 312 of the width direction sipe(s) 311 of the first central land portion 310 and the inclined deep groove(s) 122B extending from another end of the circumferential direction deep groove(s) 121 in the circumferential direction toward the opened portion(s) 322 of the width direction sipe(s) 321 of the second central land portion(s) 320 are aligned alternately along the circumferential direction. Therefore, when running on a wet road surface, drained waters from the first and second central land portions 310, 320 flow into the circumferential direction deep grooves 121 almost equally. As a result, drainage can be done equally on both of an inner side and an outer side of a tire.

In addition, the width direction sipe(s) 311, 321 communicates with the first and second circumferential direction supplemental groove(s) 210, 220 on an extended line(s) extending from the first and second lug groove(s) 411, 421 toward the first and second circumferential direction supplemental groove(s) 210, 220, and the cutout portion(s) 312, 323 is formed at the position(s). Therefore, when running on a wet road surface, drained waters from both of the first and second shoulder land portions 410, 420 flow into the first and second circumferential direction supplemental grooves 210, 220, and then are easily introduced to the circumferential direction main groove 100 via the width direction sipes 311, 321. As a result, a drainage performance can be enhanced.

In addition, the chamfer portions 314, 324 are formed at least along a circumferential-direction edge of the first and second central land portion(s) 310, 320 adjacent to the circumferential direction main groove 100. Therefore, drained waters from the first and second central land portions 310, 320 are easily introduced to the circumferential direction main groove 100 via the width direction sipes 311, 321. As a result, a drainage performance can be enhanced.

In addition, the depth D3 of the first and second circumferential direction supplemental grooves 210, 220 is smaller than the depth D2 of the deep grooved portions 120. Therefore, rigidity can be secured, and handling-and-stability can be secured.

In addition, the width direction sipe(s) 311, 321 is inclined by 0° to 20° to the tread width direction, and extends almost along the tread width direction. Therefore, its edge pressure increases, and thereby a drainage performance can be enhanced by its wiper effect.

In addition, in a case where the angles $\theta_1$, $\theta_2$ between the width direction sipes 311,321 and the tread width direction satisfy $\theta_1 > \theta_2$, the large block(s) B becomes a block having a shape extending long in the circumferential direction. Although a block loss on an inner side of a tire may become large when a camber is applied to the tire, movements can be restricted by giving the shape extending long in the circumferential direction to the large block(s) B.

In addition, the length is of the short sipes 140 is shorter than the length Ls of the width direction sipes 311, and the width ws thereof is larger than the width Ws of the width direction sipes 311. When tread rubber is compressed due to rotations of the tire 1, movements of the rubber are not absorbed at the width direction sipes 311, and thereby compression rigidity increases and a ride comfort is degraded. Therefore, by providing the short sipes 140, the movements of the rubber are absorbed, and thereby the degradation of a ride comfort can be prevented by restricting the compression rigidity.

In addition, the level the bottom surface of the first and second lug groove(s) 411, 421 is raised near the opened portion(s) 412, 422. Therefore, rigidity is made higher while restricting a speed at which hydroplaning phenomenon occurs under a condition where a steered angle is given (a handle is steered) by communicating the first and second lug groove(s) 411, 421 with the first and second circumferential direction supplemental groove(s) 210, 220, and thereby handling-and-stability can be secured.

In addition, an erroneous installation of a tire by a user can be prevented by forming a tread pattern of which an inner side has a different pattern from an outer side thereof as explained above.

(8) Other Configurations

So far, the present invention is disclosed through the above embodiments. However, it should not be interpreted that the statements and drawings constituting a part of the present disclosure limit the present invention. From this disclosure, a variety of alternate embodiments, examples, and applicable techniques will become apparent to one skilled in the art.

For example, the embodiments of the present invention can be modified as below. Specifically, a tire according to the present invention is explained as a pneumatic tire filled with air or inert gas such as nitrogen gas, but, not limited to this, may be a solid tire that is not filled with air, nitrogen gas and so on.

In addition, it is explained that the circumferential direction main groove 100 extends linearly on the tire equator CL, but, not limited to this, it may be formed at a position set off from the tire equator CL, for example, or may be formed curvedly.

In addition, it is explained that the deep grooved portion(s) 120 extends linearly on the tire equator CL, but, not limited to this, it may be formed at a position set off from the tire equator CL, for example, or may be formed curvedly.

In addition, the width direction sipe(s) 311 is a so-called open-type sipe extending from the circumferential direction main groove 100 to the first circumferential direction supplemental groove 210, but, not limited to this, may be formed as a closed-type sipe terminated in the first central land portion 310 without extending to the first circumferential direction supplemental groove 210, for example. Much the same is true on the width direction sipe(s) 321.

In addition, the short sipe(s) 140 is provided on each of the small block b1 of the first central land portion 310 in FIG. 1, but, not limited to this, it is possible to align small blocks b1 each having the short sipe 140 and small blocks b1 each having no short sipe 140 alternately, for example.

In addition, it is explained that the chamfer portions 314, 315, 324, 325, 413, 423 are formed along the outer edges of the first and second central land portion s 310, 320 and the first and second shoulder land portions 410, 420, but, not limited to this, the chamfer portions may be formed only along the outer edges of the circumferential direction main groove 100, for example.

As described above, needless to say, the present invention includes various embodiments and the like not described here. Therefore, the technical range of the present invention is to be defined only by the inventive specific matter according to the adequate claims from the above description.

Note that, the entire contents of Japanese Patent Application No. 2012-137853 (filed on Jun. 19, 2012) and Japanese Patent Application No. 2012-137857 (filed on Jun. 19, 2012) are incorporated in the specification of the present application by reference.

INDUSTRIAL APPLICABILITY

As explained above, the present invention can be utilizes in a tire that satisfies both of a drainage performance and handling-and-stability on a wet road surface.

The invention claimed is:

1. A tire comprising:
a circumferential direction main groove extending in a circumferential direction on a tread surface;
a pair of circumferential direction supplemental grooves extending in the circumferential direction, and located on both sides of the circumferential direction main groove in a tread width direction; and
a pair of central land portions having a rib shape, and formed between the circumferential direction main groove and the pair of circumferential direction supplemental grooves, wherein
each of the central land portions has a plurality of sipes, and each of the sipes extends to the circumferential direction main groove to form an opened portion,
the circumferential direction main groove has shallow grooved portions and deep grooved portions a depth of which from the tread surface is larger than a depth of the shallow grooved portions from the tread surface,
the depth of the shallow grooved portions from the tread surface is smaller than a depth of the circumferential direction supplemental grooves from the tread surface,
a plurality of short sipes that are opened to the circumferential direction main groove are formed on the central land portion located on an inner side when the tire is installed on a vehicle, and
a length of the short sipes is smaller than a length of the sipes, and a width of the short sipes is larger than a width of the sipes.

2. The tire according to claim 1, wherein
each of the deep grooved portions has a circumferential direction deep groove extending in the circumferential direction, and inclined deep grooves inclined to the circumferential direction, and
the inclined deep grooves extend from circumferential-direction ends of the circumferential direction deep groove to the opened portions of the sipes of the central land portions.

3. The tire according to claim 2, wherein,
in the deep grooved portions, the inclined deep groove extending from one of the circumferential-direction ends of the circumferential direction deep groove toward the opened portion of the sipe of one of the central land portions and the inclined deep groove extending from another of the circumferential-direction ends of the circumferential direction deep groove toward the opened portion of the sipe of another of the central land portions are aligned alternately in the circumferential direction.

4. The tire according to claim 1, wherein
an inclined angle, to a tread width direction, of the sipes of the central land portion located on the inner side when the tire is installed on the vehicle is larger than an inclined angle, to the tread width direction, of the sipes of the central land portion located on an outer side when the tire is installed on the vehicle.

5. The tire according to claim 1, further comprising
a pair of shoulder land portions on outer sides of the circumferential direction supplemental grooves in the tread width direction, and each of the shoulder land portions having a plurality of lug grooves that communicates with the circumferential direction supplemental groove, wherein
the sipes of the central land portions communicate with the circumferential direction supplemental grooves on extended lines extending from the lug grooves toward the circumferential direction supplemental grooves, and
cutout portions are formed at positions where the sipes of the central land portions communicate with the circumferential direction supplemental grooves.

6. The tire according to claim 1, wherein
chamfer portions are formed at least along a circumferential-direction edge of the central land portion adjacent to the circumferential direction main groove.

7. The tire according to claim 1, wherein
a depth of the circumferential direction supplemental grooves from the tread surface is smaller than a depth of the deep grooved portions from the tread surface.

* * * * *